US012525214B1

(12) United States Patent
Zala et al.

(10) Patent No.: US 12,525,214 B1
(45) Date of Patent: Jan. 13, 2026

(54) PENDANT FIXTURE WITH MODULAR ACOUSTIC BAFFLE VANES

(71) Applicant: Focal Point, LLC, Chicago, IL (US)

(72) Inventors: Randal Zala, Chicago, IL (US); Jacob Deakin, Lowell, IN (US); Veronica Spencer, Chicago, IL (US)

(73) Assignee: Focal Point, LLC, Chicago, IL (US)

( * ) Notice: Subject to any disclaimer, the term of this patent is extended or adjusted under 35 U.S.C. 154(b) by 0 days.

(21) Appl. No.: 19/048,623

(22) Filed: Feb. 7, 2025

(51) Int. Cl.
*G10K 11/16* (2006.01)
*F21S 8/06* (2006.01)
*F21V 17/02* (2006.01)
*F21V 33/00* (2006.01)
*F21Y 115/10* (2016.01)

(52) U.S. Cl.
CPC .............. *G10K 11/16* (2013.01); *F21S 8/061* (2013.01); *F21V 17/02* (2013.01); *F21V 33/0056* (2013.01); *F21Y 2115/10* (2016.08)

(58) Field of Classification Search
CPC ... G10K 11/16; G10K 11/161; F21V 33/0056; F21V 29/773
See application file for complete search history.

(56) References Cited

U.S. PATENT DOCUMENTS

| | | | | |
|---|---|---|---|---|
| 6,231,212 | B1 | 5/2001 | Cooney | |
| 8,087,456 | B2 | 1/2012 | Wei | |
| 9,147,390 | B2 | 9/2015 | Swinkels | |
| 9,441,634 | B2 | 9/2016 | Spiro | |
| 11,250,828 | B2 | 2/2022 | Patterson | |
| 2014/0078756 | A1 * | 3/2014 | Tuttle | F21V 1/18 362/382 |
| 2016/0123005 | A1 | 5/2016 | Booij | |
| 2018/0336875 | A1 * | 11/2018 | Patterson | F21V 15/01 |
| 2019/0338931 | A1 * | 11/2019 | Ross | F21S 8/066 |
| 2019/0339443 | A1 * | 11/2019 | Ross | G02B 6/0073 |
| 2021/0090542 | A1 * | 3/2021 | Elmvang | F21V 17/12 |
| 2021/0324624 | A1 * | 10/2021 | Ahmadi | E04B 1/8209 |
| 2022/0026057 | A1 * | 1/2022 | Elmvang | F21S 8/061 |
| 2023/0018325 | A1 * | 1/2023 | Komonosky | F21V 33/006 |

FOREIGN PATENT DOCUMENTS

| | | | |
|---|---|---|---|
| EP | 2444718 | A2 | 2/2015 |
| JP | H02306503 | A | 12/1990 |

* cited by examiner

*Primary Examiner* — Alexander K Garlen
(74) *Attorney, Agent, or Firm* — Greenberg Traurig, LLP

(57) ABSTRACT

A modular fixture which may include an LED light board and an LED driver, positioned along a support bracket, and may include a plurality of acoustic baffle vanes. The fixture further includes a series of fasteners, some of which are positioned along the support bracket, while others are positioned on an inward-facing surface of the acoustic panels. The fasteners are capable of removably securing acoustic panels to the support bracket.

30 Claims, 13 Drawing Sheets

PENDANT FIXTURE WITH MODULAR ACOUSTIC BAFFLE VANES

BACKGROUND OF THE INVENTION

The present description relates generally to the construction of fixtures such as lighting fixtures, and in particular, to the construction of an LED based lighting fixture having acoustic sound absorbing baffle vanes forming a structure surrounding the housing of the lighting fixture, and specifically, to such a lighting fixture in which the acoustic sound absorbing baffle vanes are mechanically and releasably affixed to a support structure by modular components. Principles of the present invention may further be adapted to providing acoustic sound absorbing baffle vanes that do not include any source of lighting.

SUMMARY OF THE INVENTION

The invention defines a fixture which may include a first bracket having a first plurality of vane attachment apertures and a second bracket having a second plurality of vane attachment apertures. The second bracket may be positioned below said first bracket, in which the second bracket is aligned with the first bracket such that the second plurality of vane attachment apertures operably aligns with the first plurality of vane attachment apertures. The lighting fixture may further include a plurality of baffle vanes, in which each baffle vane may include a lateral portion having a first end and a second end; a longitudinal portion extending from the second end of the lateral portion; and baffle vane attachment elements positioned at the first end of said baffle vanes, to fastenably attach said baffle vanes to said first and second brackets. The lighting fixture may also include a clamping mechanism configured to fix the position of the first bracket relative to the position of the second bracket, within the plurality of the baffle vanes.

The baffle vane attachment elements may further include a first protrusion extending upwardly from the first end of the lateral portion, the first protrusion may be configured to be received by one of the first plurality of aligned apertures; and a second protrusion extending downwardly from the first end of the lateral portion, the second protrusion may be configured to be received by one of the second plurality of operably aligned apertures, after the first protrusion is positioned within the upper aperture.

In this embodiment, the height of the first protrusion extending upwardly may be greater than the depth of the second protrusion extending downwardly.

The position of the first bracket relative to the position of the second bracket within the plurality of the baffle vanes may be configured such that a baffle vane may be removably affixed between the first and second brackets.

In one embodiment, the shapes of the first bracket and the second bracket may be identical, and each of the plurality of baffles may be substantially L-shaped. In another embodiment, the shapes of the first and second brackets may differ.

The lighting fixture may further include: a central base configured to connect to the second bracket; and a suspension mechanism coupled to the central base and configured to affix the fixture to an elevated structure, such as a ceiling.

The clamping mechanism may include a magnetic element configured to orient and restrain the position of the second bracket relative to the central base.

In one embodiment, the central base may include a lighting element.

Further, each of the plurality of baffle vanes may extend radially, relative to the center of the central base.

Further, the clamping mechanism may restrainably attach the second bracket to the central base.

In a preferred embodiment, the clamping mechanism may include: a first tab extending radially from the first bracket; a second tab extending radially from the second bracket; and a bushing member positioned between the first tab and the second tab for orientation within an aligned detent in the central base.

The clamping mechanism may be a first clamping mechanism and the first and second tabs are located on one of the inner perimeter and outer perimeter of the first and second brackets. The fixture may further comprise: a second clamping mechanism including: a third tab extending radially from the first bracket; and a fourth tab extending radially from the second bracket; in which a bushing member may be positioned between the third tab and the fourth tab; where the third and fourth tabs are located on the other of the inner diameter and the outer diameter of the first and second brackets.

The first bracket and the second bracket may further comprise two or more bracket segments joined together to form the first bracket and second bracket. One or more straight bracket segments may be insertable between the two or more curved bracket segments to form a substantially non-circular shaped fixture geometry.

A lighting fixture of the present invention may include: a base comprising a lighting element; a first band connected to the base, the first band including a first plurality of slots; and a second band identical to the first band, the second band including a second plurality of slots in alignment with the first plurality of slots of the first band. The lighting fixture may further include a plurality of sound-dampening elements, each comprising a first protrusion configured for restrainable attachment to at least one of the first and second plurality of slots, wherein the plurality of sound-dampening elements are held in place around the base via at least one of the first and second bands.

The plurality of sound-dampening elements may each further include a second protrusion configured for restrainable attachment to at least one of said first and second plurality of slots, wherein the plurality of sound dampening elements are held in place around the base via the first and second bands.

The first band may be curvilinear. Alternatively, the first band may be in the shape of a quadrilateral, and/or may include modular sub-components capable of integrated assembly into different shapes, as desired.

The lighting fixture may include a suspension mechanism configured to attach to the first band, and further configured to affix the lighting fixture to an elevated structure. The suspension mechanism may be attachable directly to either of the first or second bands.

The first band and the second band may be concentric; and the first protrusion and the second protrusion may extend in opposite directions to each other.

Each of the plurality of sound-dampening elements may extend radially relative to the center of the base.

In another embodiment, the invention comprises a method for assembling a fixture which may include: providing a first bracket, the first bracket having a first plurality of slots; inserting, into each of the first plurality of slots, a first portion of one of a plurality of sound-dampening elements; positioning a second bracket atop the plurality of sound-dampening elements by inserting a second portion of one of the plurality of sound-dampening elements into each of a second plurality of slots in the second bracket; providing a center hub; and inserting at least one fastener into the center hub through the first bracket and the second bracket, thereby affixing the first bracket and the second bracket to the center hub.

A method for assembling a fixture may further include: attaching a first end of a suspension mechanism to the center hub and a second end of the suspension mechanism to an elevated structure, again, such as a ceiling. A method for assembling a fixture may further include: attaching a first end of a suspension mechanism to the second bracket and a second end of the suspension mechanism to an elevated structure.

The invention may include a center hub that may include a lighting element, the first bracket and the second bracket may be identical, and the at least one fastener may prompt the first bracket and the second bracket to clamp about the plurality of sound-dampening elements.

DETAILED DESCRIPTION

The following description of the invention herein is not intended to limit the scope of the description to the precise form or forms detailed herein. Instead, the following description is intended to be illustrative so that others may follow its teachings.

While the invention as disclosed and described herein is in the form of an LED pendant lighting fixture designed to be suspended from a ceiling or other support structure, it should be appreciated that the inventive concepts disclosed herein can be utilized in other types of lighted and non-lighted fixtures, in other various shapes and orientations, and for other intended applications. For example, one or more novel aspects of the invention disclosed herein may be adapted and applied to sound absorbing acoustic panels that do not include a lighting element and wherein the modular aspect of the present invention may be integrated into a system comprising a plurality of aesthetically varying or identical acoustic pendants, some of which include lighting elements and some of which do not.

Figure 1:
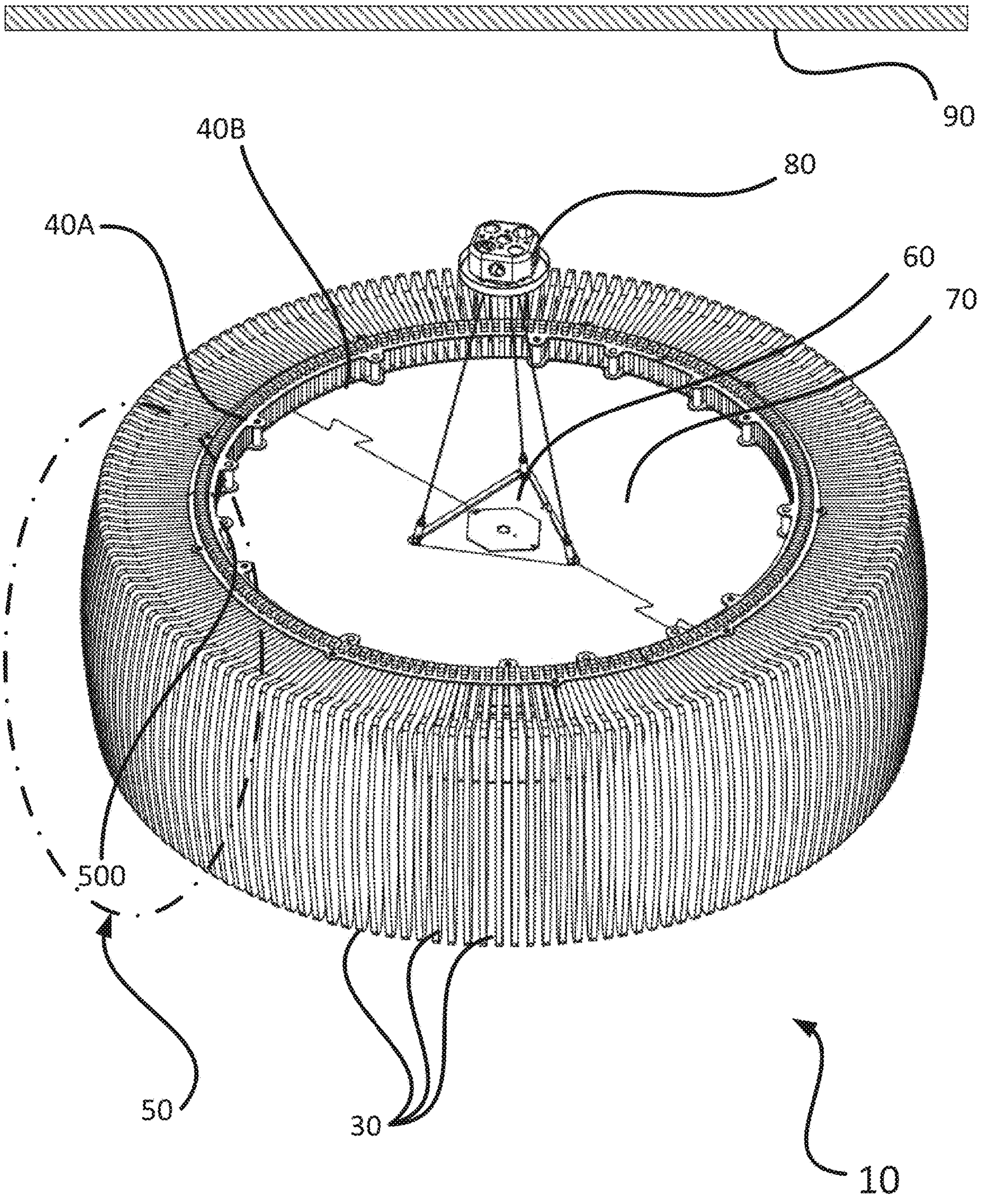
FIG. 1 is a top perspective view of an example lighting fixture, particularly exhibiting an assembly of modular baffle vanes of the present invention.

FIG. 1 of the drawings discloses pendant LED-based lighting fixture 10. As shown, lighting fixture 10 includes shade subassembly 50. Shade subassembly 50 may further include modular acoustic baffle vanes 30 which are affixed between first support bracket 40A and second support bracket 40B, with the outer edges of the baffle vanes defining the perimeter of fixture 10. In this embodiment, first support bracket 40A and second support bracket 40B may be constructed from a metal stamping or machined piece having a design that allows for the attachment of the baffle vanes 30 to the lighting fixture 10. First support bracket 40A and second support bracket 40B may be substantially similar to, or of the same design, as one another. First support bracket 40A and second support bracket 40B can be constructed of other materials such as plastic, wood, composites, or the like and, depending upon the overall fixture design, may not necessarily extend the entire perimeter of the fixture.

Fixture 10 further includes a main body or base 60 to which second support bracket 40B may be attached. Fixture 10 may further include an installation guide 70 which may be placed on top of the main body or base 60, and which may substantially fix the position of the shade subassembly 50 to base 60. Fixture 10 also includes suspension mechanism 80 attached to the base of fixture 10. Suspension mechanism 80 may enable the fixture 10 to attach and hang from an elevated surface or article, such as ceiling 90 of FIG. 1. Base 60 may further include LEDs, a driver or power source, and other electrical components not pictured in FIG. 1. While the lighting elements incorporated into the illustrated embodiments incorporate LED's, other light producing elements, such as incandescent, fluorescent, halogen or neon lighting sources may be used, either alone or in combination with LED's. In some embodiments, the fixture may not include LED's or any lighting source, and instead may be an acoustic-only fixture containing acoustic baffle vanes 30. In some embodiments, fixture 10 may not include a suspension mechanism 80, and fixture 10 may be supported from beneath fixture 10 or may be mounted directly to the surface of an article.

Figure 2A:
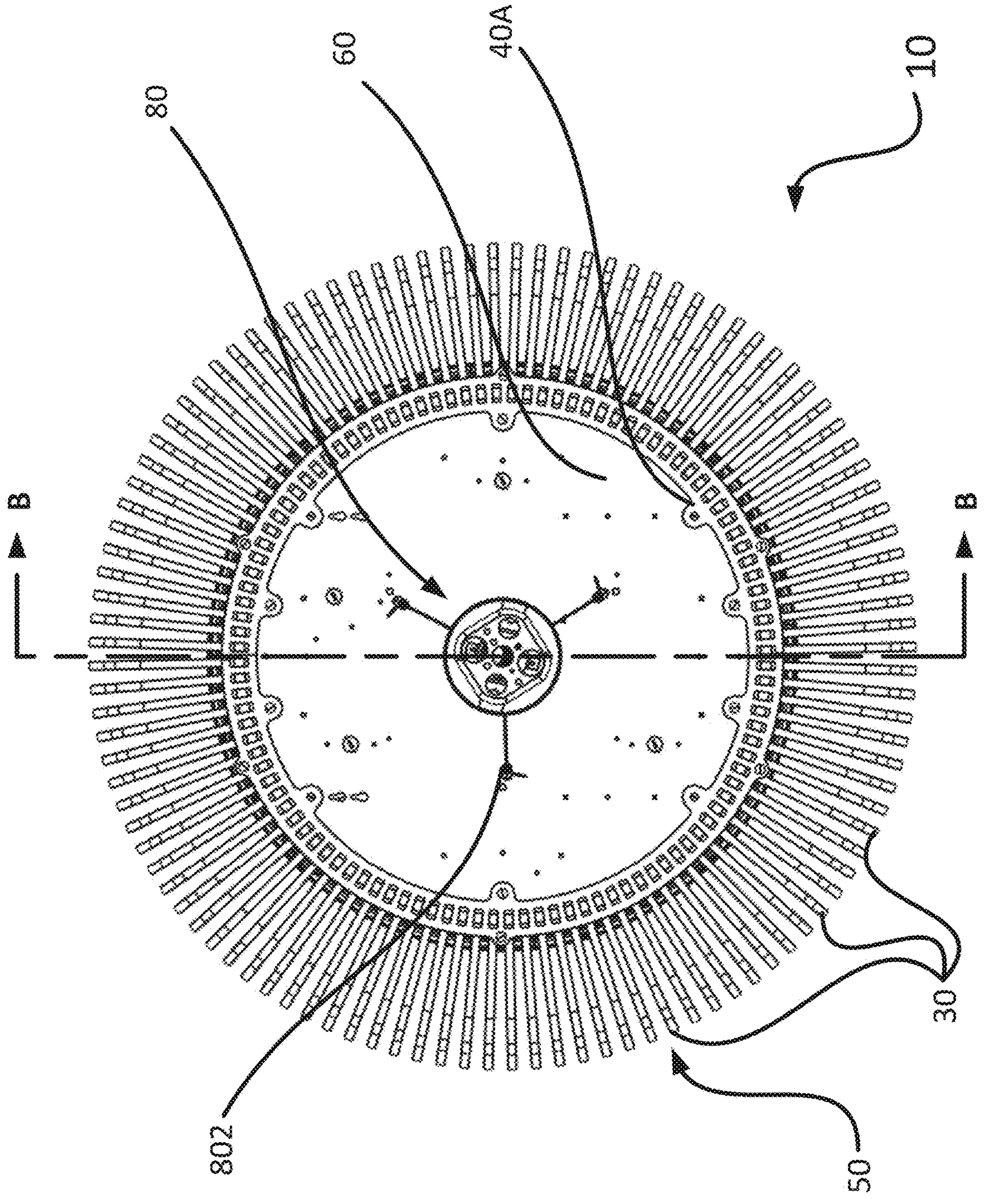
FIG. 2A is a top plan view of the example lighting fixture illustrated in FIG. 1.

FIG. 2A illustrates a top plan view of example lighting fixture 10. Shown in FIG. 2A, suspension mechanism 80 may connect to lighting fixture 10 at base 60 of lighting fixture 10. Shade subassembly 50 may surround base 60 of lighting fixture 10, so as to form a perimeter of baffle vanes 30 extending outwardly from fixture 10. FIG. 2A likewise shows cross-section B-B, forming the view for FIG. 2B.

Figure 2B:
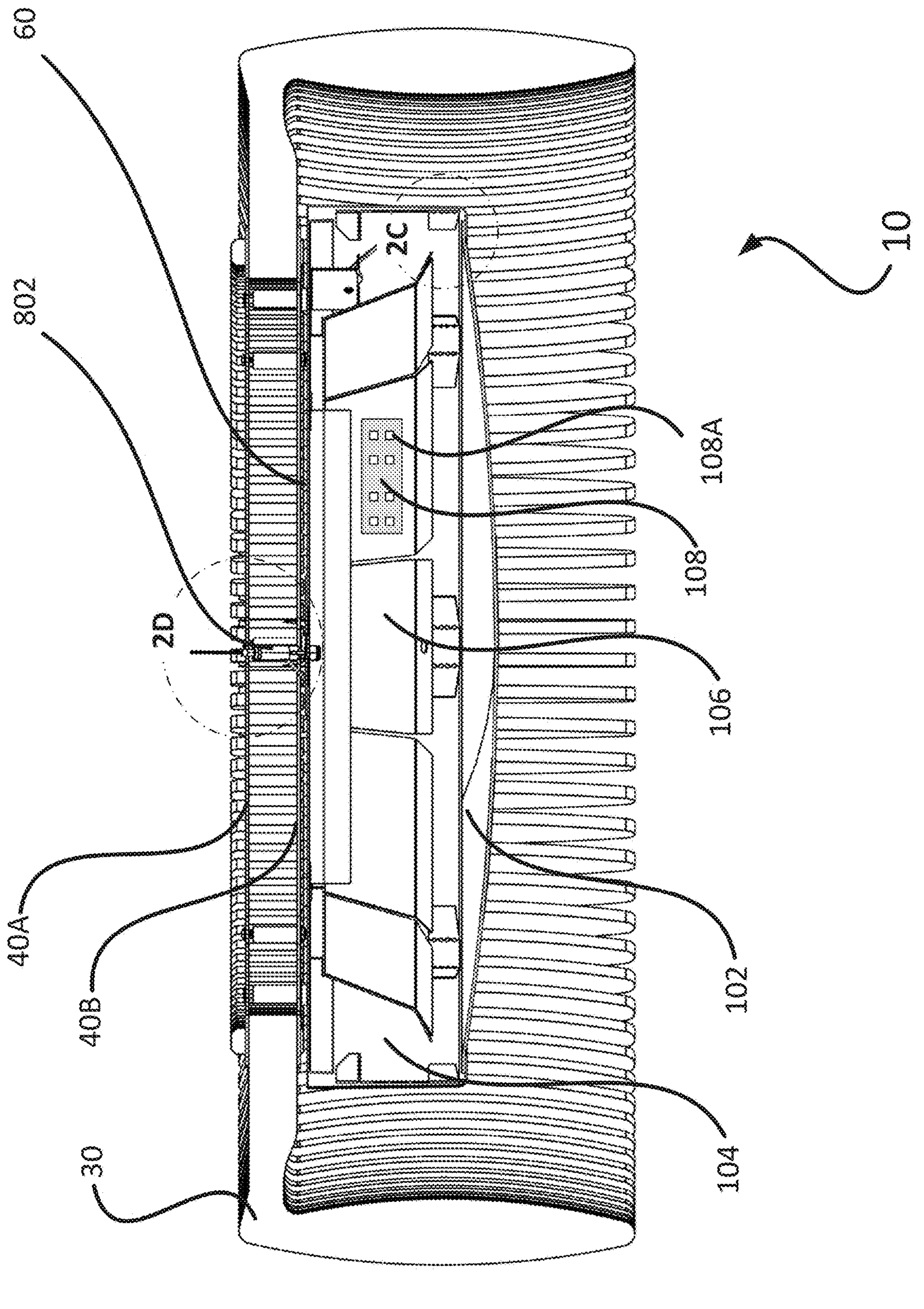
FIG. 2B is a front cross-section view of the example lighting fixture illustrated in FIG. 1, taken along line B-B shown in FIG. 2A, and looking in the direction of the arrows, showing a first embodiment of LED embedded reflectors.

FIG. 2B illustrates cross-section B-B as shown in FIG. 2A, and further illustrates example components of fixture 10, and particularly example lighting components contained within base 60 of fixture 10. Shown in FIG. 2B, example base 60 of lighting fixture 10 may contain a lens 102, a side wall 104, at least one reflector 106, and at least one LED board 108. In an example, lens 102 is held in place by flange 110 (see FIG. 2C) extending from sidewall 104. Reflector 106 is fastened to fixture 10 at base 60, and one or more LED boards, such as board 108 is fastened to reflector 106. Suspension mechanism 80 (see FIG. 2D) is fastened to fixture 10 at base 60 by securing a suitable fastener, such as one of a bolt or nut to one side of base 60 and by securing the other of a bolt or nut containing a cable, to the other side of base 60, thus clamping base 60 between said bolt and nut.

Figure 2D:
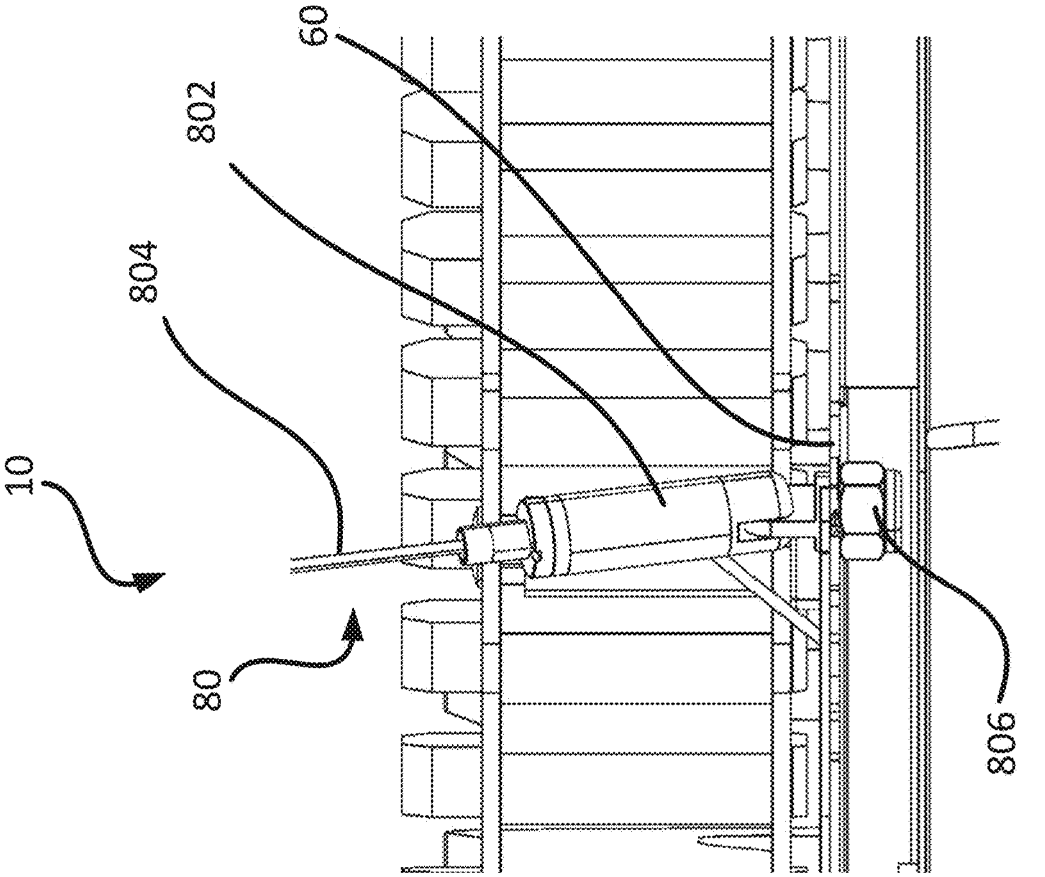
FIG. 2D is a partial front cross-section view of the example lighting fixture illustrated in FIG. 1, taken along line B-B shown in FIG. 2A and showing detailed portions 2D of the example lighting fixture suspension mechanism.
Figure 2C:
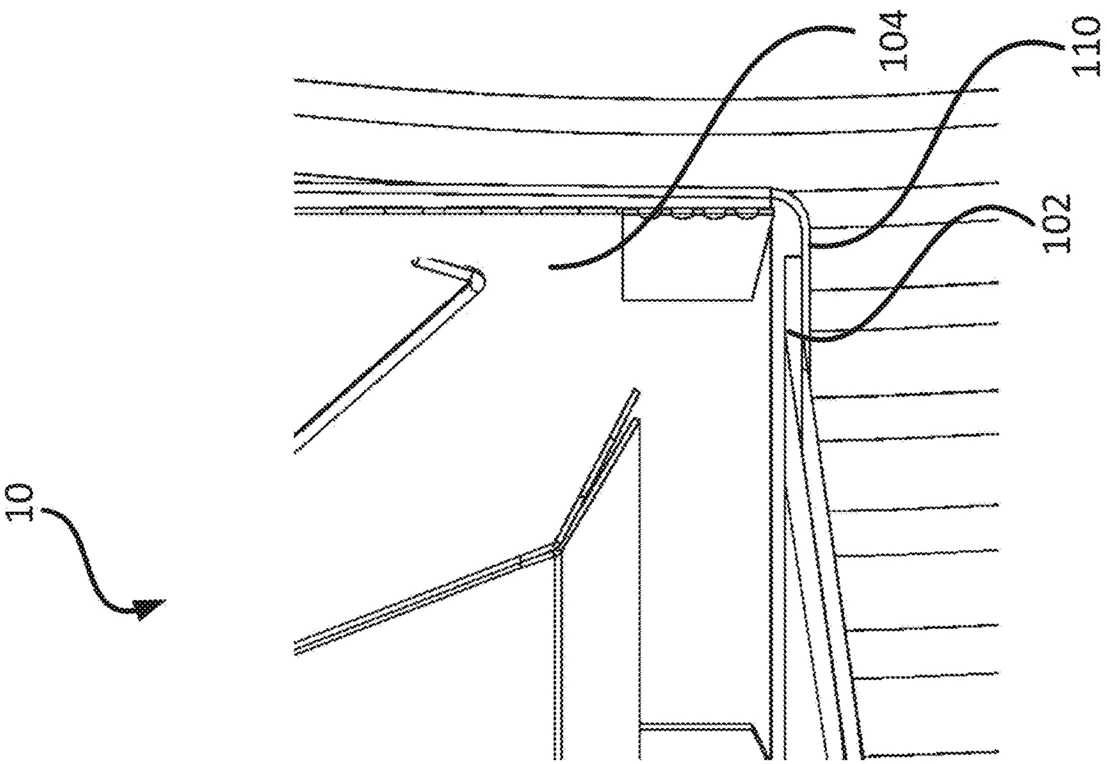
FIG. 2C is a partial front cross-section view of the example lighting fixture illustrated in FIG. 1, taken along lines B-B shown in FIG. 2A and showing detailed portions 2C of the example lighting fixture lens and sidewall.

FIG. 2C illustrates in further detail cross-section B-B as shown in FIG. 2A, further illustrating example components of fixture 10, and particularly example lens 102 and side wall 104 of fixture 10. As shown in FIG. 2C, sidewall 104 of lighting fixture 10 may further include flange 110, which may be formed from the same piece of material comprising side wall 104 or may be mechanically or otherwise fastened to side wall 104. Flange 110, connected to side wall 104 is positioned inwardly towards the center of fixture 10, and may be configured to support lens 102. Thus, flange 110 may support and adjustably fix lens 102 in a restrained position with respect to fixture 10.

FIG. 2D illustrates in further detail cross-section B-B as shown in FIG. 2A, by further illustrating example components of fixture 10, particularly example suspension mechanism 80. Suspension mechanism 80 may be fastened to fixture 10 at base 60 by securing a suitable fastener, such as one of a bolt or nut fastener 806 to one side of base 60 and securing the other of a bolt or nut containing cable grip 802, which grips or holds cable 804, to the other side of base 60, thus clamping base 60 between the bolt and nut. In an example embodiment, fixture 10 may be suspended by a suspension mechanism other than one relying upon a cable. In this example, suspension mechanism 80 may include rigid tubing or stems, which may be fastened to base 60 by bolt, nut, or similar fastening component, in lieu of cable 804. In this example, one or more rigid tubes or stems may be welded to base 60 of fixture 10. It will be known that fixture 10 may be suspended from an elevated surface, such as a ceiling, by using cable, rigid tubing, stems, or the like. By way of example, in FIG. 2D, cable 804 with cable grip 802 and fastener 806 can be replaced by a rigid tube or stem, to enable the fixture's restrained suspension.

Figure 2E:
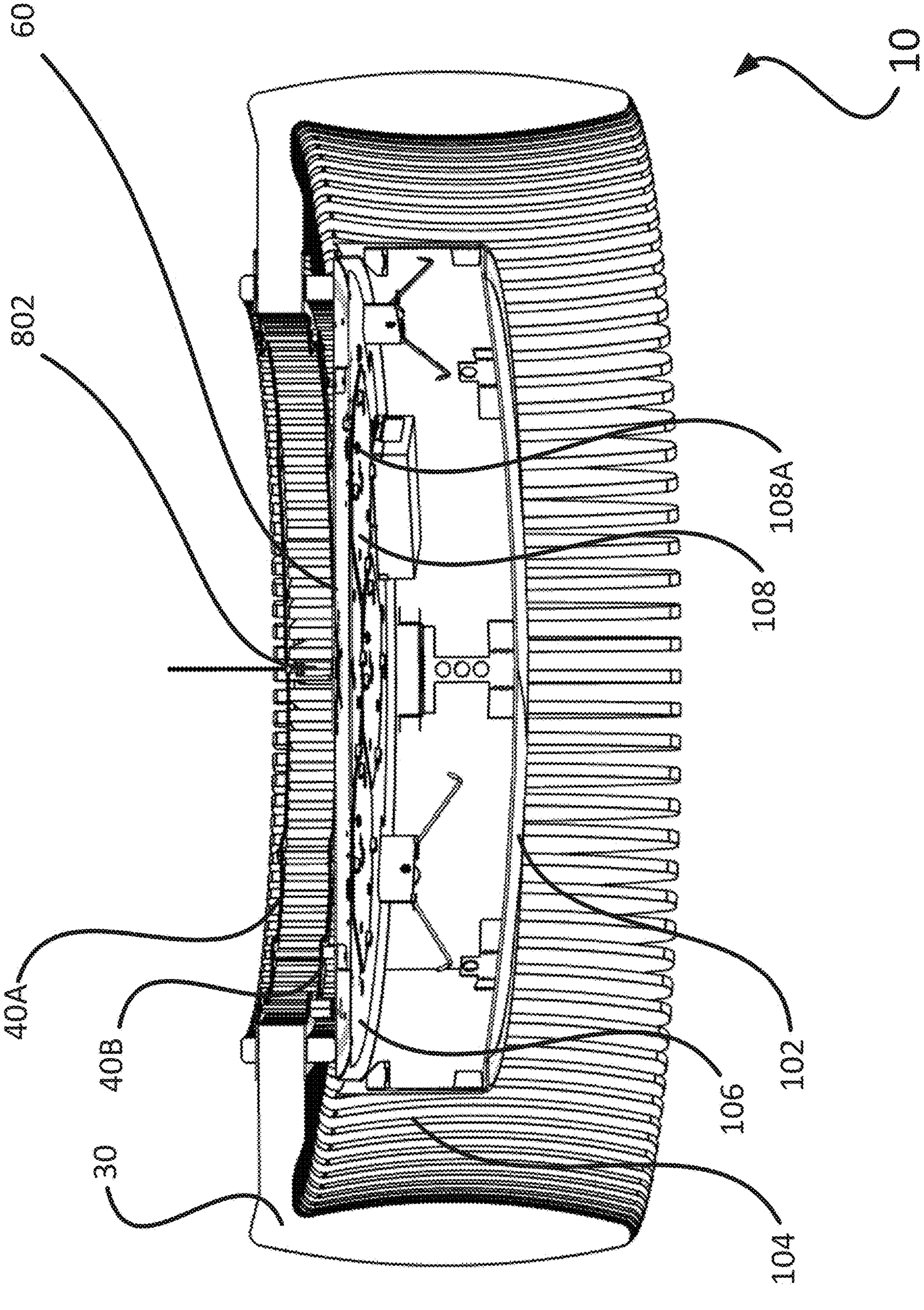
FIG. 2E is a front perspective cross-section view of another example of the lighting fixture shown in FIG. 1, taken along line B-B shown in FIG. 2A and looking in the direction of the arrows, in which an alternative embodiment of LED embedded reflector is shown.

FIG. 2E illustrates cross-section B-B as shown in FIG. 2A in a front, slightly perspective view, and further illustrates example components of fixture 10 in another embodiment, and particularly example lighting components affixed to base 60 of fixture 10. As shown in FIG. 2E, reflector 106 may be a substantially flat component this is fastened to fixture base 60 in a substantially horizontal orientation, facing lens 102. At least one, but in the example embodiment, a plurality of LED boards 108, with LEDs 108A, may be fastened to substantially horizontal reflector 106, such that the light produced by LED boards 108 would be directed via downward reflection, directly towards lens 102.

Figures 3A, 3B, 3C:
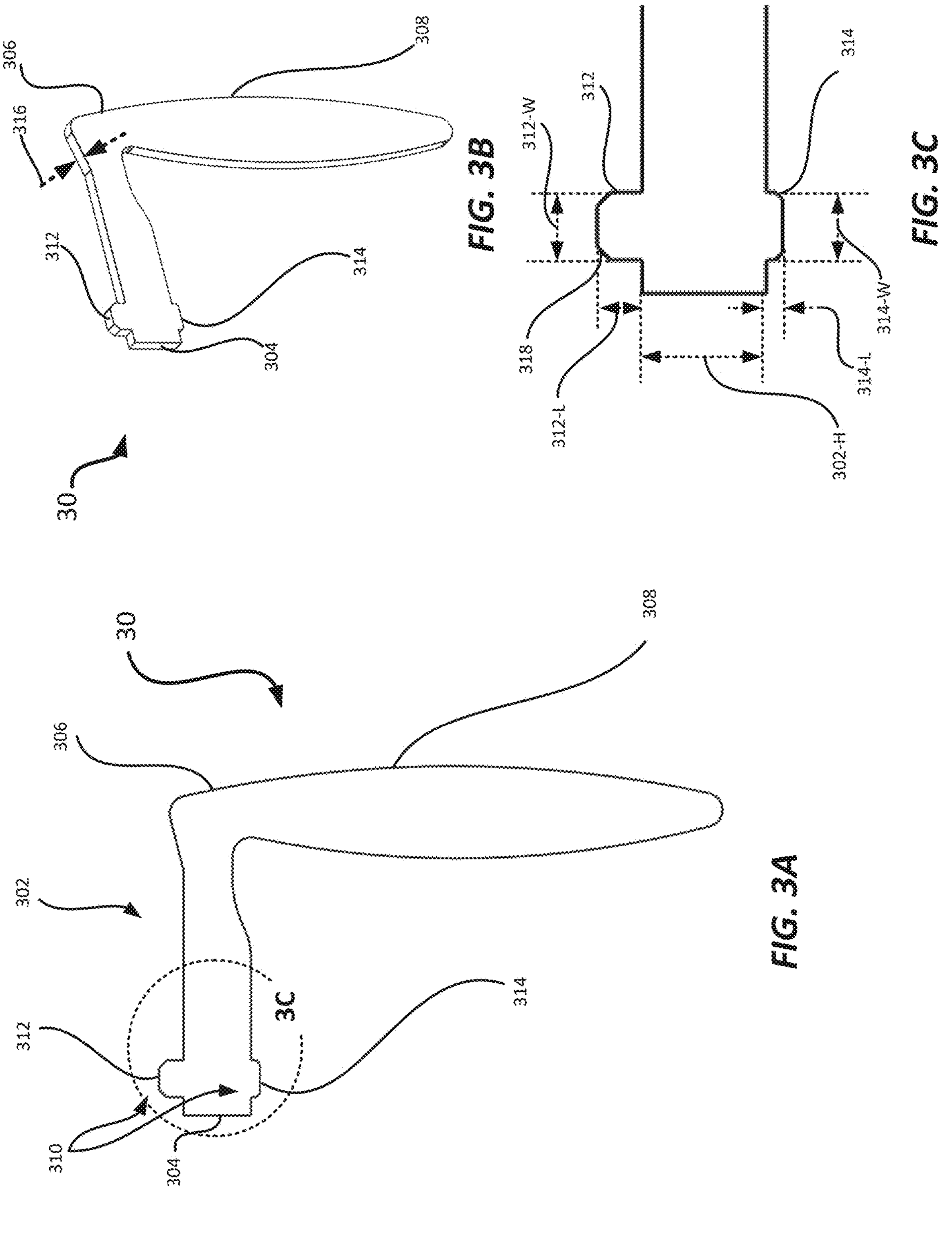
FIG. 3A is a front elevated view of an example baffle vane which may, in an example, be modularly attached to the example lighting fixture illustrated in FIG. 1.
FIG. 3B is a front-top perspective view of the example baffle vane illustrated in FIG. 3A.
FIG. 3C is a partial front detailed view of a lateral portion of the example baffle vane illustrated in FIG. 3A, showing the detail of the baffle vane indicated as portion 3C in FIG. 3A.

FIGS. 3A-C illustrate an example embodiment of baffle vane 30. FIG. 3A is a front plan view of example baffle vane 30. Shown in FIG. 3A, baffle vane 30 may have a lateral portion 302, which may further include a first end 304 and a second end 306. Lateral portion may also have a height 302-H. Baffle vane 30 may further include a longitudinal portion 308, which extends from second end 306 of lateral portion 302. Baffle vane 30 may further include at least one, but in some examples more than one or a plurality of attachment elements 310 positioned at first end 304 of lateral portion 302. Attachment elements 310 may include, in some embodiments, a first protrusion 312 extending upwardly from first end 304 of lateral portion 302. In some embodiments, attachment elements 310 may include a second protrusion 314, shorter than first protrusion 312, extending downwardly from first end 304 of lateral portion 302.

FIG. 3B is a front perspective view of example baffle vane 30. Shown in FIG. 3B, baffle vane 30 may additionally have a thickness, such as thickness 316. In some examples, baffle vane 30 may have uniform thickness 316 along the entire profile of baffle vane 30. In some examples, baffle vane 30 may have varying thickness 316 and/or varying textures. In some examples, thickness 316, along with width 312-W of first protrusion 312 and width 314-W of second protrusion 314 may correspond to an opening or aperture of a support bracket or support structure, such as support bracket 400 of FIG. 4. The support brackets or support structures are used to mount baffle vanes 30 to a lighting fixture 10. In some embodiments, a first support bracket or support structure may have a first set of apertures corresponding to width 312-W of first protrusion 312, and a second support bracket or support structure may have a second set of apertures corresponding to width 314-W of second protrusion 314, such that first protrusion 312 may only be inserted into the first support bracket or support structure, and second protrusion 314 may then be inserted into the lower second support bracket or support structure.

FIG. 3C is an enlarged detailed view of first end 304 of lateral portion 302 of baffle vane 30. In some embodiments, such as the one shown in FIG. 3C, first protrusion 312 and second protrusion 314 may have a substantially rectilinear shape. In some embodiments, first protrusion 312 and second protrusion 314 may have a round shape or may have any other shape and still function in much the same way. In some embodiments, first protrusion 312 may have length 312-L that is longer in length than a length 314-L of second protrusion 314. In some embodiments, second protrusion length 314-L may be the same as first protrusion length 312-L. First protrusion 312 likewise may have width 312-W, and second protrusion 314 may have width 314-W. In some embodiments, first protrusion 312 and second protrusion 314 may have the same width. In some embodiments, first protrusion 312 and second protrusion 314 may have different widths, which may dictate the proper orientation of baffle vane 30 during the installation process.

In some embodiments, first protrusion 312 and second protrusion 314 may contain a chamfer 318 on the edges of the protrusion 312, 314, to allow for the protrusion to more easily be inserted and/or removed from an aperture of a support bracket. In some embodiments, width 312-W and width 314-W are the same, and apertures in a first support bracket or support structure and second support bracket or support structure are the same, such that either first protrusion 312 or second protrusion 314 may be installed in either the first or second support bracket or support structure.

In some examples, baffle vane 30 may be manufactured from a sound-absorbing material, such as PET or recycled PET. In some examples, the sound absorbing properties of baffle vane 30 may be altered or adjusted by altering thickness 316 of baffle vane 30 and the size of either or both of lateral portion 302 and longitudinal portion 308, which may increase the overall surface area of baffle vane 30 for sound absorption. In some examples, baffle vane 30 may be made by cutting the profile of baffle vane 30 from a sheet of PET or recycled PET. In some examples, baffle vane 30 may be made from material other than PET, such as wood, composite, metal, alloy, or any other suitable material, and may be made by molding, machining, cutting, or any other suitable manufacturing process.

In one embodiment, acoustic baffle vanes 30, as shown in FIGS. 3A through 3C, are fabricated from at least partially recycled PET (polyethylene terephthalate) panels that possess inherent acoustic dampening properties that serve to interfere with the propagation of sound waves, to enable the present lighting fixture to serve as a source of light and as a noise reduction device in the environment in which the lighting fixture is utilized. Modular baffle vanes 30 are semi-rigid in composition and thus enhance the structural integrity of the light fixture housing. Acoustic baffle vanes 30 also provide flexibility enabling changes to the fixture's color or texture—without painting, simply by exchanging panels. Acoustic baffle vanes 30 are typically formed in a thickness ranging from 6 mm to 12 mm thick and have an average noise reduction coefficient (NRC) of 0.55 to 1.0. Alternatively, acoustic baffle vanes 30 may be fabricated from other materials having requisite sound absorbing characteristics, such as for example, organic material including wool, moss, wood etc.; and/or inorganic material including polyester, foam, cellulose, etc. While acoustic baffle vanes 30 are illustrated as having a single layer, a two-or-more ply construction may also be utilized. Moreover, a multi-ply construction of acoustic side panel may include one or more internal supports, fabricated of metal or other suitably rigid material, which may be configured, in part, based upon the overall size of fixture 10.

While acoustic baffle vanes 30 of FIGS. 3A through 3C are shown as having a planar "L" shaped configuration, they could be configured to have alternative profiles and shapes that would cooperate with a support structure of alternative designs. For example, a curved or undulating acoustic baffle vane design could be provided which is designed to cooperate with a curved or undulating support structure of appropriate length, width, and with support rails located to accommodate same. In addition, baffle vanes 30 may be configured for modularity and adaptability to allow for multiple sizes of varying diameter, and may include baffles with varying baffle vane heights and varying baffle vane profiles. Further, each baffle vane may be offered in a solid color, in multiple colors, including variations using non-uniform, dual color, or alternating colors and/or textures, even within the same fixture.

Figure 4B:
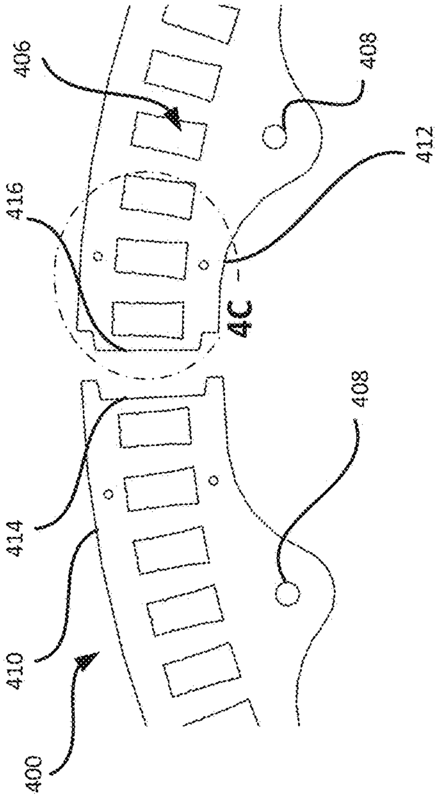
FIG. 4B is a partial top plan detailed view of the example support bracket segment illustrated in FIG. 4A, showing detailed portions 4B of the example support bracket segment.
Figure 4C:
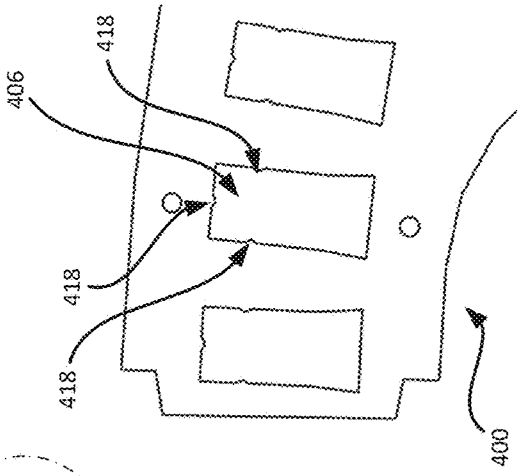
FIG. 4C is a partial top plan detailed view of an example aperture region of the example support bracket segment illustrated in FIG. 4B, showing detailed portion 4C of the example apertures, from FIG. 4B.
Figure 4A:
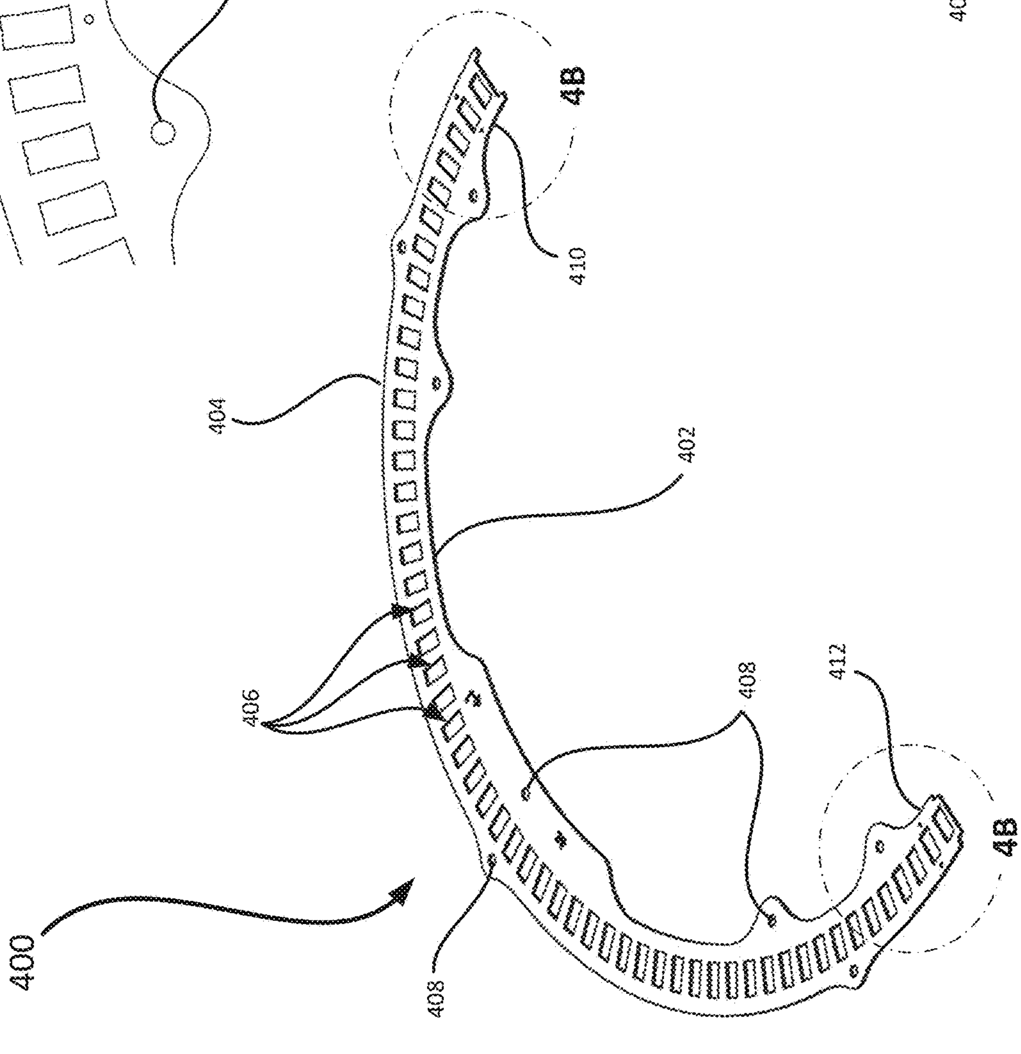
FIG. 4A is a top perspective view of an example support bracket segment of the example lighting fixture illustrated in FIG. 1.

FIGS. 4A-B illustrate an example embodiment of a support bracket segment 400 which forms a portion of support bracket 40. FIG. 4A is a top perspective view of support bracket segment 400. As shown in FIG. 4A, support bracket segment 400 may be in the shape of a semicircle with inner perimeter 402 and outer perimeter 404. Support bracket segment 400 may contain at least one, and in some examples many, vane attachment apertures 406 located between inner perimeter 402 and outer perimeter 404. Vane attachment apertures 406 may span along the entire inner perimeter 402 and outer perimeter 404. These attachment apertures may be shaped to receive a protrusion extending from a baffle vane. Support bracket segment 400 may further contain at least one, but in some examples a plurality of fastener locations 408. Fastener locations 408 may be positioned on either or both of inner perimeter 402 and outer perimeter 404 of support bracket segment 400.

FIG. 4B is a detailed top-plan view of support bracket segment 400 illustrated in FIG. 4A. Shown in FIG. 4A, support bracket segment 400 includes first end 410 and second end 412. Shown in FIG. 4A, and in greater detail in FIG. 4B, support bracket segment 400 may include a first connecting geometry 414 on first end 410 and may include a second connecting geometry 416 on second end 412. Second connecting geometry 416 may be shaped to receive first connecting geometry 414 of another aligned segment, such that two or more support bracket segments 400 may be connected to each other to form support bracket 40. In one example, as shown in FIG. 4B, first connecting geometry 414 and second connecting geometry 416 may be substantially trapezoidal in shape, where first connecting geometry 414 includes a trapezoidal-shaped cutout to receive a like trapezoidal-shaped protrusion of second connecting geometry 416. First connecting geometry 414 and second connecting geometry 416 may assisting in assembling support bracket segments 400 by facilitating the alignment of support bracket segment 400 to an adjoining support bracket segment. In an example, first connecting geometry 414 and second connecting geometry 416 may be of another shape, such as semi-circular, triangular, or otherwise, to accomplish the same function of assisting with positioning support bracket segment 400 for assembly.

FIG. 4C illustrates a detailed view of example aperture 406 of support bracket segment 400. Shown in FIG. 4C, aperture 406 may additionally include at least one, but in an example, a plurality of barbs 418. Barbs 418 may protrude into baffle vane 30 (so shown in FIGS. 3A through 3C) and may help to secure baffle vane 30 within support bracket segment 400 during assembly by providing a contact or interference fit.

Figure 4E:
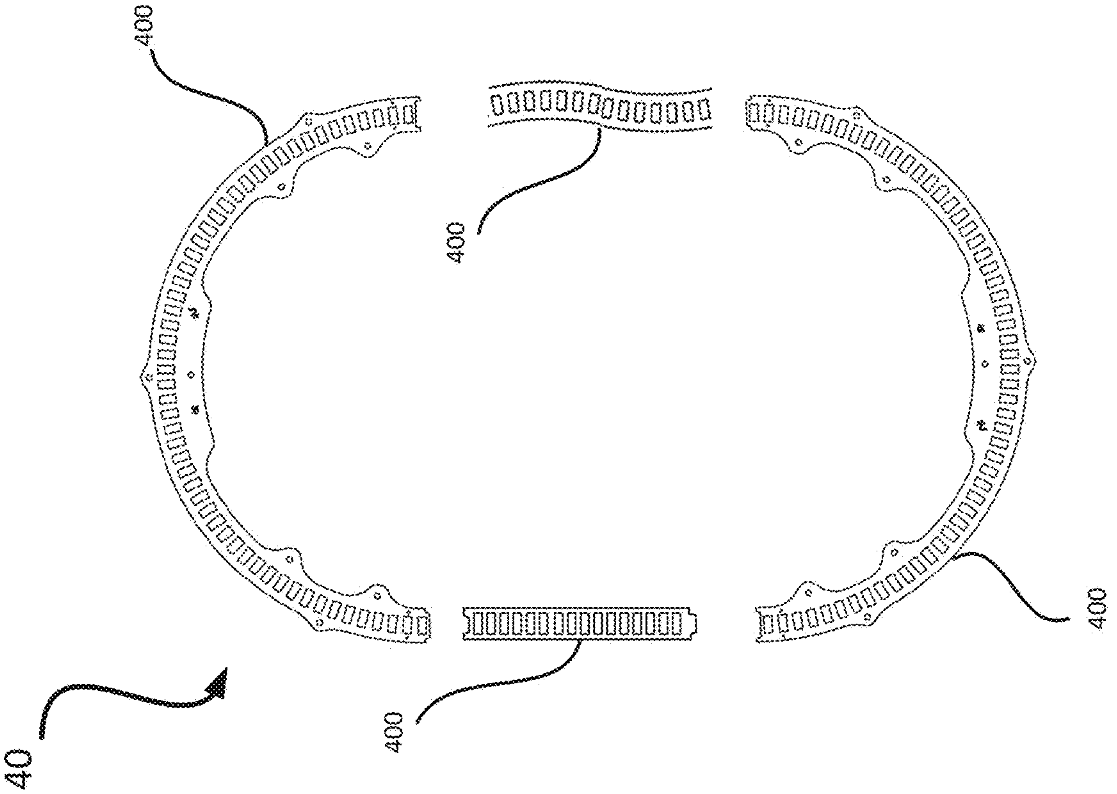
FIGS. 4D-E are top plan views of example alternative configurations of the support bracket segments for the alternative lighting fixture shown in FIG. 1.
Figure 4D:
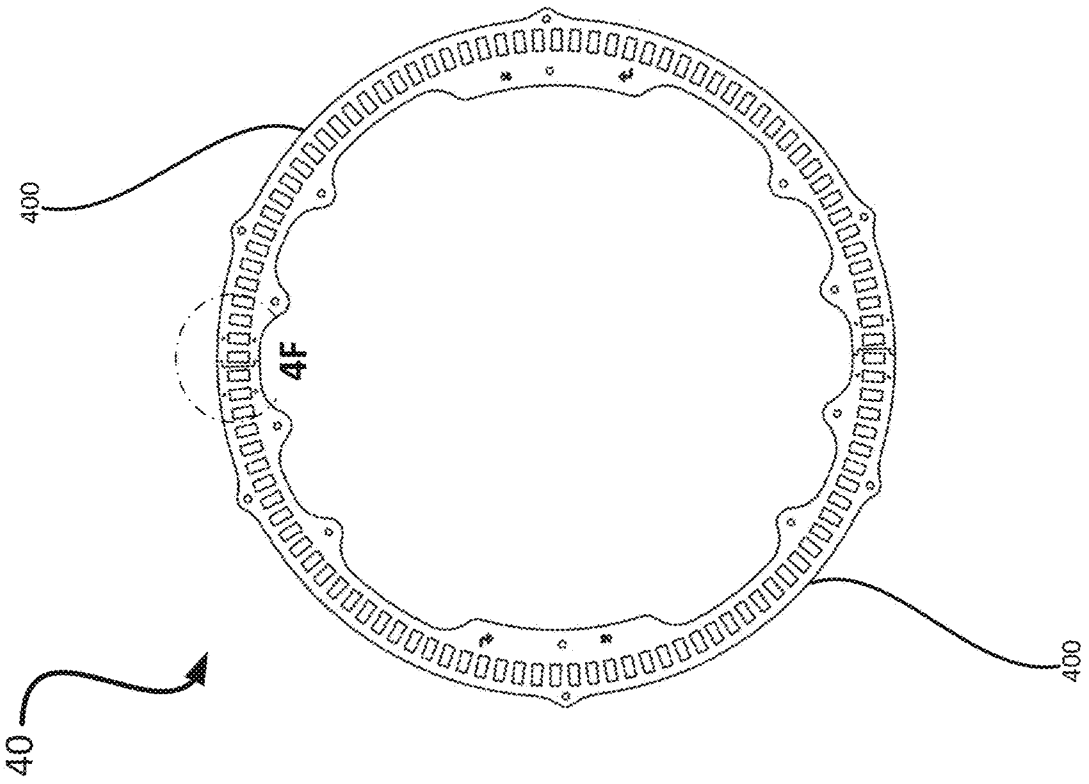

FIGS. 4D-E illustrate example configurations of a plurality of support bracket segments 400 assembled to each other to form support bracket 40. FIG. 4D is a top plan view of an example circular configuration of support bracket 40. In an example, support bracket segment 400 is a semi-circular ring segment which may be modularly assembled with other support bracket segments to form a support bracket 40 perimeter around a lighting fixture. In some examples, support bracket segment 400 may be a shape other than semi-circular, such as rectangular, linear, triangular, etc. As an example, support bracket segments 400 may be provided in a plurality of varying shapes and segments, which may allow for configurations capable of installation with any number of fixtures having varying diameters and shapes.

FIG. 4E is a top plan view of an example oval or "race track"-shaped configuration of support bracket segments 400 assembled together. In the example, a first support bracket segment 400 may have a semicircular shape, and a second support bracket segment 420 may have a substantially linear or undulating shape, such that the support bracket segments may be connected together and configured in a way which creates a oval or race-track shaped support bracket 40, as desired by a user.

Support bracket 40 may be constructed from a metal stamping or machined piece having a design that allows for the attachment of baffle vanes to a lighting fixture. Such other materials can include plastic, wood, composites, or the like. In FIGS. 4A through 4F, support bracket 40 may be constructed by laser cutting or waterjet cutting. It may be stamped, cast, machined, or may be manufactured by computer-controlled processes used to cut support bracket 40 from any suitable material including metal, plastic, wood, composites, or the like.

Figure 4F:
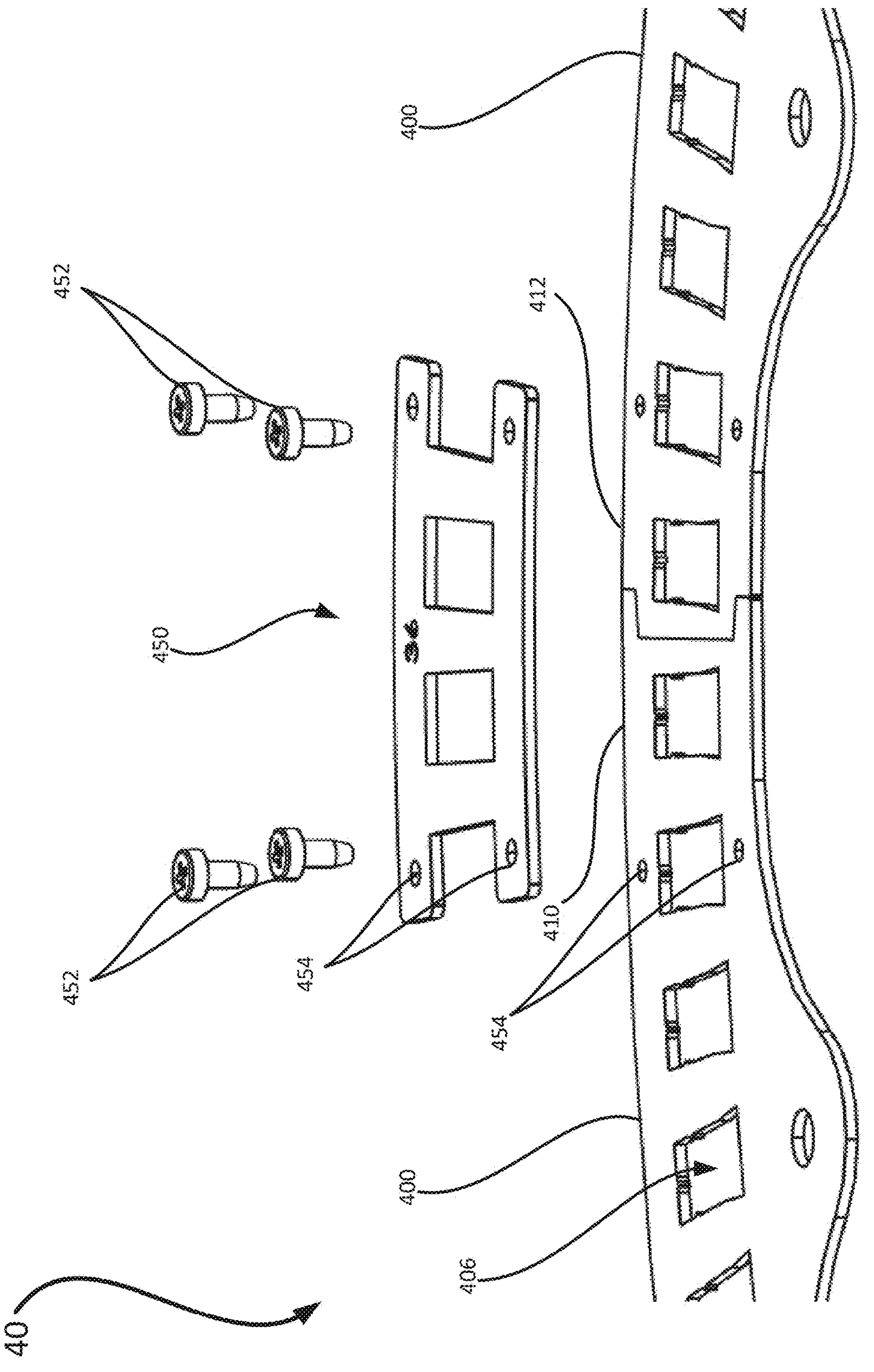
FIG. 4F is a partial detailed, front perspective exploded view of the example circular configuration of support bracket shown in FIG. 4D, showing a joiner bracket affixing two support bracket segments in a given bracket.

FIG. 4F is a partial detail, front perspective exploded view of the example circular configuration of support bracket 40, showing an example connection between two support bracket segments 400. In this example, support bracket 40 may also include joiner bracket 450 which may be used to join two adjacent support bracket segments 400. Joiner bracket 450 may be fastened to first end 410 of one support bracket segment 400 and may be fastened to second end 412 of another support bracket segment 400 by a plurality of fasteners 452, which may be self-tapping or threaded, to affix in threaded holes within the bracket segments. Joining support bracket segments 400 with joiner bracket 450 may add additional support and rigidity to support bracket 40 and may assist with assembly. Joiner bracket 450 may also allow for support bracket 40 to be configured in multiple support bracket segments 400, which may also assist in assembly. Joiner bracket 450 may reduce the number of baffle vanes that need to be inserted into apertures 406 at any one time, respectively, and thus reduce the force needed to assemble a plurality of baffle vanes 30 into support bracket 40, by allowing support bracket 40 to be assembled in a plurality of support bracket segments 450 which may then be modularly joined together. By way of example, one support bracket segment 400 may be populated with baffle vanes 30 by inserting baffle vanes into apertures 406 of the support bracket segment 400. Support bracket segments 400, with baffle vanes 30 installed, may then be fastened to one another to form completed support bracket 40 around the perimeter of fixture 10.

Figure 5B:
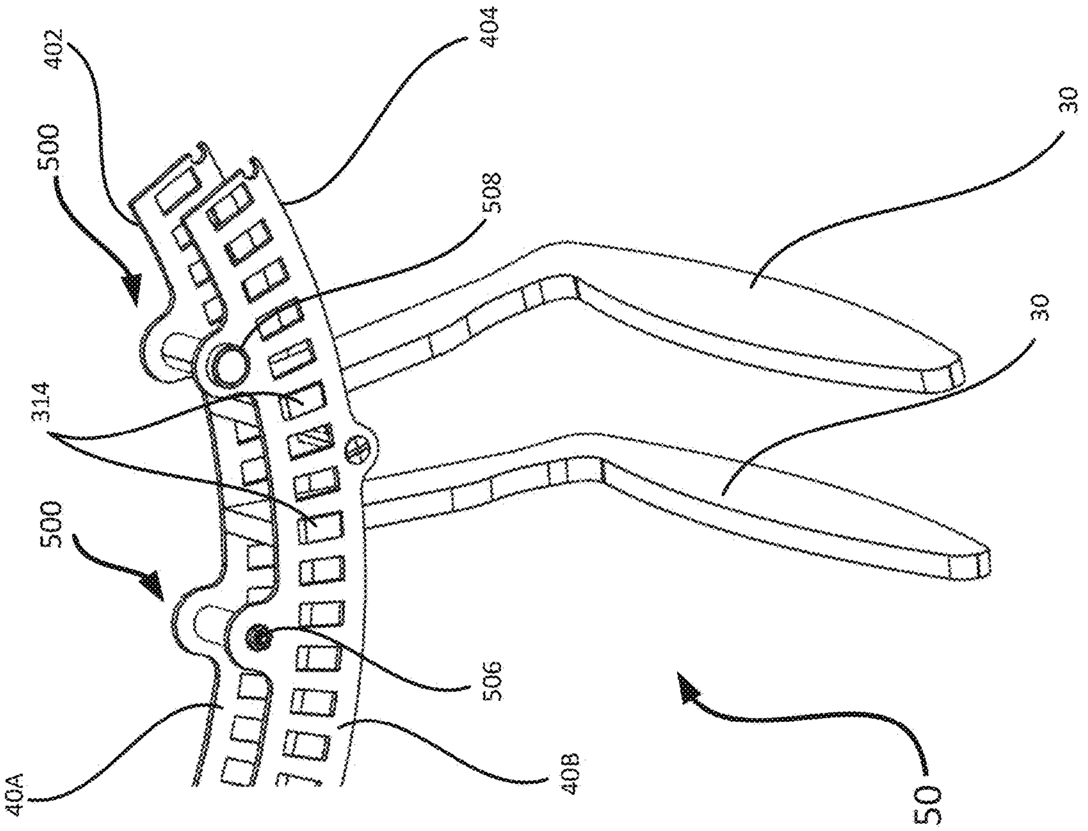
FIG. 5B is a bottom perspective view of an example shade subassembly of the example lighting fixture illustrated in FIGS. 1 and 5A.
Figure 5A:
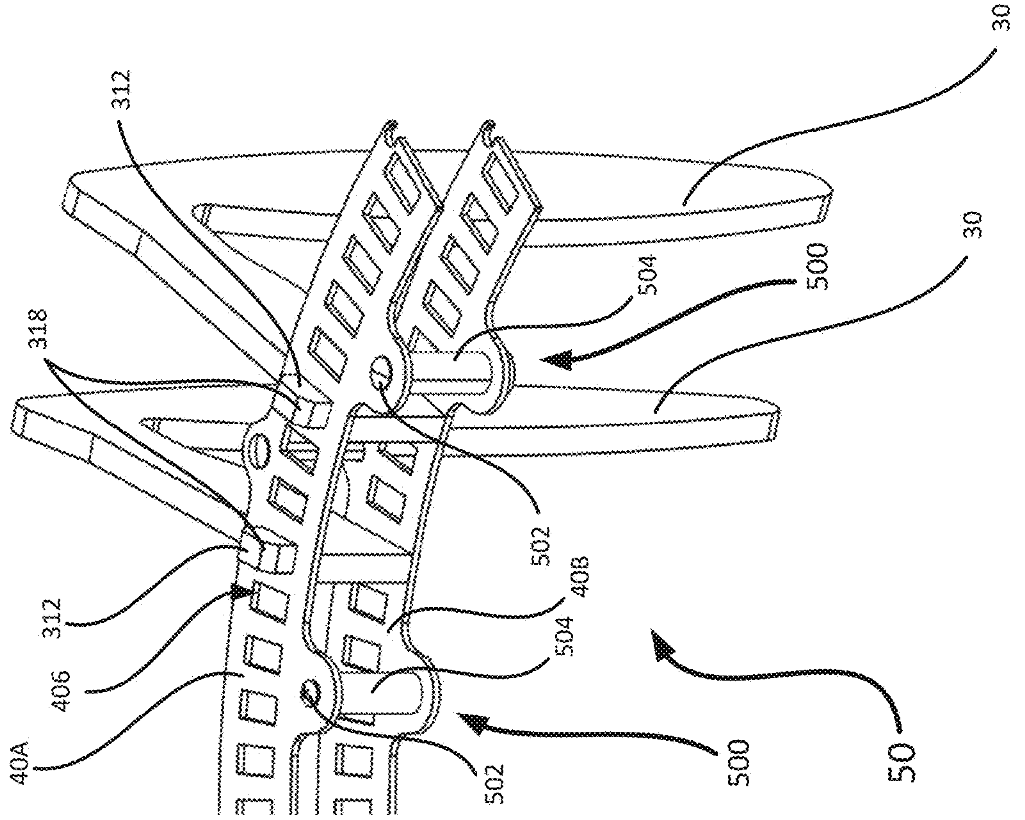
FIG. 5A is a top perspective view of an example shade subassembly of the example lighting fixture illustrated in FIG. 1 showing the orientation of the example baffle vanes.

FIGS. 5A-B illustrate an example embodiment of shade subassembly 50 of the example fixture 10 illustrated in FIG. 1. FIG. 5A is a top perspective view of shade subassembly 50. Shade subassembly 50 includes at least one but in some examples a plurality of baffle vanes 30. Baffle vanes 30 may be removably and modularly fixed from the top by a first support bracket 40A and fixed from the bottom by a second support bracket 40B. Support brackets 40A-B are removably fixed together by at least one, but in some embodiments a plurality of clamping mechanisms 500, which may include spacers fixed between two mated fasteners, such as a threaded bolt and mated nut.

Shown in FIG. 5A, baffle vanes 30 may be removably and modularly fixed to support bracket 40 by inserting first protrusion 312 of baffle vane 30 into a vane attachment aperture 406 of a first support bracket 40A. In some examples, first protrusion 312 of baffle vane 30 may have a chamfered, rounded, or other edge shape 318 which may allow for easier insertion and/or removal of baffle vane 30 into vane attachment aperture 406 of bracket 40.

FIG. 5B is a bottom perspective view of shade subassembly 50. Shown in FIG. 5B, second protrusion 314 of baffle vane 30 may be inserted into and positioned within vane attachment aperture 406 of second support bracket 40B. Second support bracket 40B may be aligned with first support bracket 40A such that vane attachment apertures 406 of both support brackets 40 align with each other. In some embodiments, second protrusion 314 of baffle vane 30 may be shorter in length 314-L than length 312-L of first protrusion 312. The shorter length 314L of second protrusion 314 may allow for baffle vane 30 to more easily be inserted and removed from between support brackets 40A-B. Additionally, in some embodiments, shorter length 314-L of second protrusion 314 may be held in-place by the downward force of gravity, and therefore may not require a length as long as length 312-L of first protrusion 312.

Also shown in FIGS. 5A-B, shade subassembly 50 further includes clamping mechanism 500. Clamping mechanism 500 may further include fastener locations 408 on both first support bracket 40A and second support bracket 40B. In some embodiments, support bracket 40 includes fastener locations positioned on inner perimeter 402 of support bracket 40. In some embodiments, support bracket 40 may contain fastener locations positioned on outer perimeter 404 of support bracket 40. In some embodiments, such as the one illustrated in FIGS. 5A-B, support brackets 40A and 40B may contain fastener locations 408 on both inner perimeter 402 and outer perimeter 404 of support bracket 40, to preclude against deviations in spacing between the brackets. Clamping mechanism 500 may further include a fastener 502, insertable into fastener locations 408 of support bracket 40. Fastener 502 may be a threaded screw, rivet, clip, or any other suitable mechanical fastener.

Clamping mechanism 500 may further include a bushing 504 as a spacer located in between first support bracket 40A and second support bracket 40B. Busing 504 may define a spacing distance between first support bracket 40A and second support bracket 40B. In some embodiments, bushing 504 height 504-H may correspond to height 302-H of lateral portion 302 of baffle vane 30. In some embodiments, bushing height 504-H may be the same as height 302-H of lateral portion 302 of baffle vane 30. Thus, in this embodiment, the spacing between first support bracket 40A and second support bracket 40B as defined by bushing height 504-H may be the same as height 302-H of lateral portion 302 of baffle vane 30, and thus there may be line-on-line contact between support brackets 40A-B and lateral element 302 of baffle vane 30. In some embodiments, bushing height 504-H may be greater than height 302-H of lateral element 302 of baffle vane 30. In this embodiment, bushing height 504-H may still be less than the combined height of lateral element 302-H, the length of first protrusion 312-L and the length of second protrusion 314-L, such that baffle vane 30 and specifically lateral element 302 is still captured between first support bracket 40A and second support bracket 40B.

Fastener 502 may be first inserted through fastener location 408 on first support bracket 40A, through bushing 504, and finally through fastener location 408 on second support bracket 40B. Clamping mechanism 500 may further include a threaded nut 506 which may be threaded onto fastener 502 below second support bracket 40B. Fastener 502 and nut 506 may clamp first support bracket 40A, bushing (spacer) 504, and second support bracket 40B together in line-on-line contact.

In some embodiments, such as the embodiment shown in FIG. 5B, clamping mechanism 500 may further include a magnetic element 508 included as part of nut 506. Magnetic element 508 may be used to position shade subassembly 50 onto a lighting fixture, to prevent shifting of the shade subassembly 50 about a lighting fixture. In some embodiments, magnetic element 508 may be integral to nut 506, or its associated spacer or bushing. In some embodiments, magnetic element 508 may be a separate component fastenably attached to nut 506.

Figure 5D:
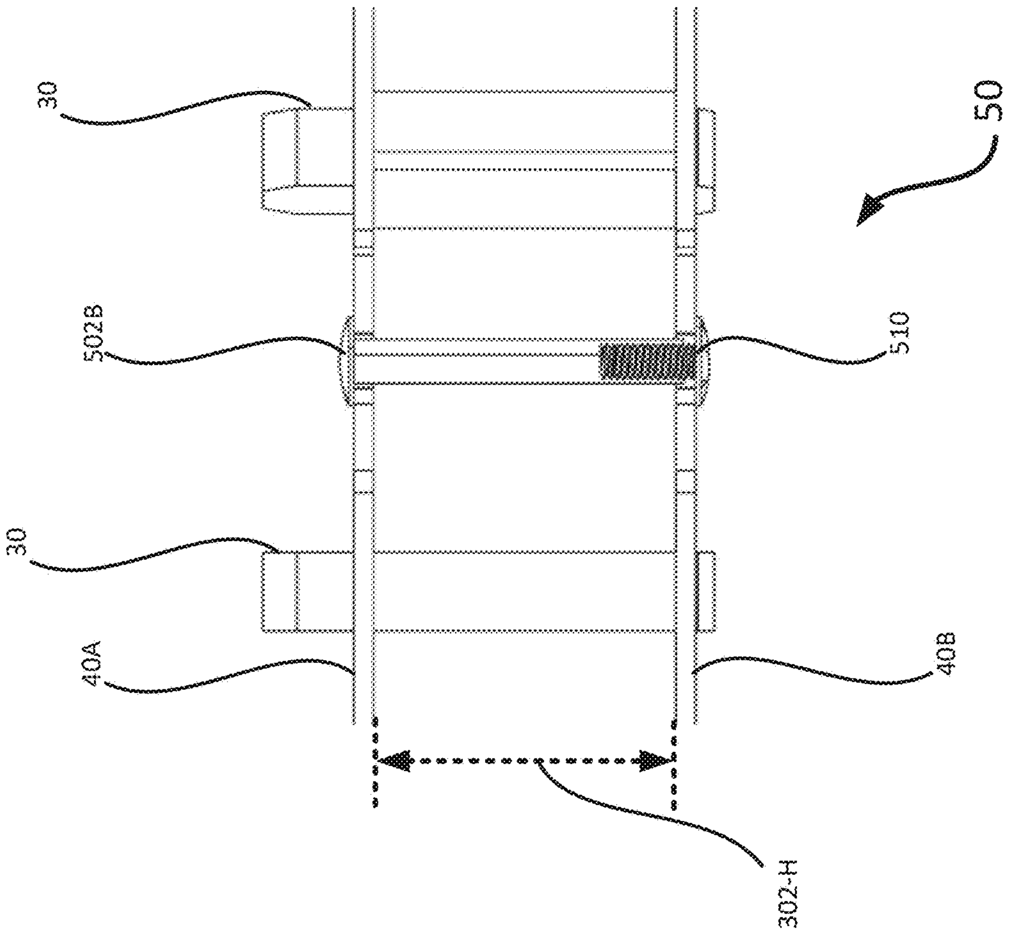
FIG. 5D is a partial cross section view of the example shade subassembly illustrated in FIG. 5C, taken along line D-D of FIG. 5C and looking in the direction of the arrows.
Figure 5C:
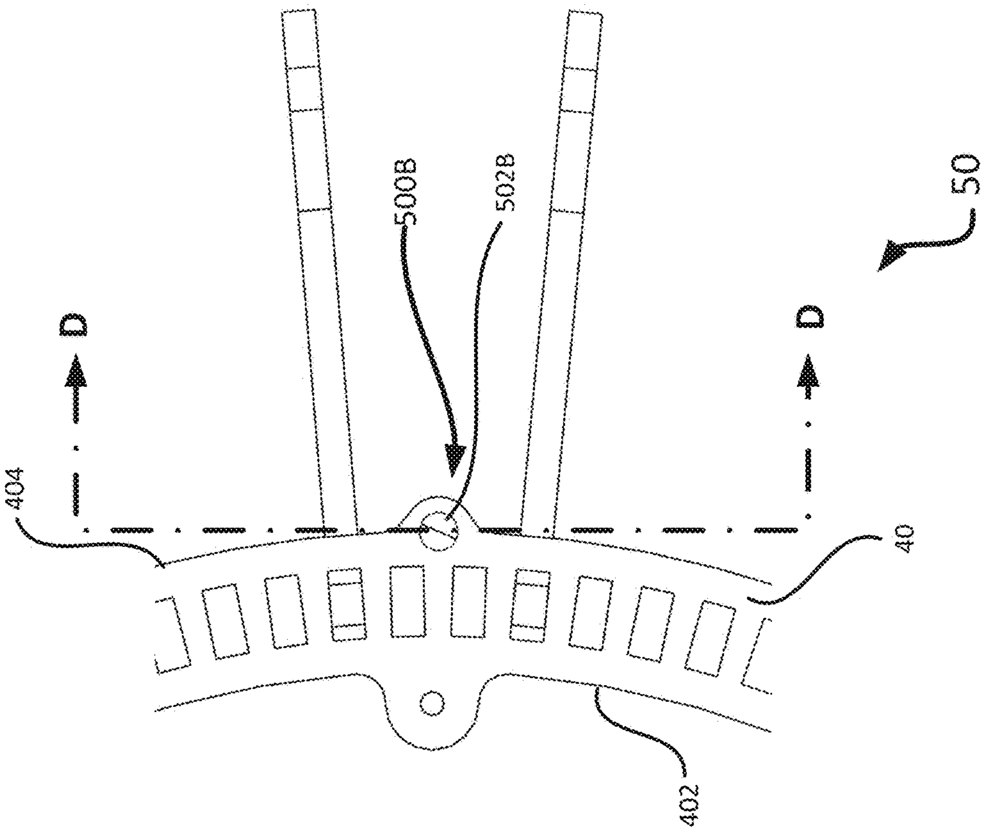
FIG. 5C is a top plan view of an example shade subassembly of the example lighting fixture illustrated in FIG. 1.

FIGS. 5C-D illustrate an example embodiment of clamping mechanism 500B of shade subassembly 50 in FIGS. 5A-B. FIG. 5C is a top plan view of clamping mechanism 500B. In some examples, fastener locations 408 on support brackets 40A-B may provide for clamping mechanism 500B to be located on outer perimeter 404 of support brackets 40A-B.

FIG. 5D is a partial cross-section view of the top plan view of FIG. 5C, illustrating a partial cross section of example clamping mechanism 500B. In some embodiments, such as the embodiment shown in FIGS. 5A-B, clamping mechanism 500B may not include a bushing. In the example, clamping mechanism may include fastener 502B which may be an internally threaded post. Fastener 502B may be inserted through first support bracket 40A and through second support bracket 40B. In an example, fastener 502B may not extend through to second support bracket 40B. In the example embodiment, clamping mechanism 500 may further include a screw 510, which may be inserted from the other side of second support bracket 40B, into the internal threads of fastener 502B. In this example, when fastener 502B is shorter than height 302-H of lateral portion 302 of baffle vane, when screw 510 is threaded into fastener 502B, fastener 502B and screw 510 may compress first support bracket 40A and second support bracket 40B together, and thus may provide a clamping force on baffle vane 30.

Figure 6C:
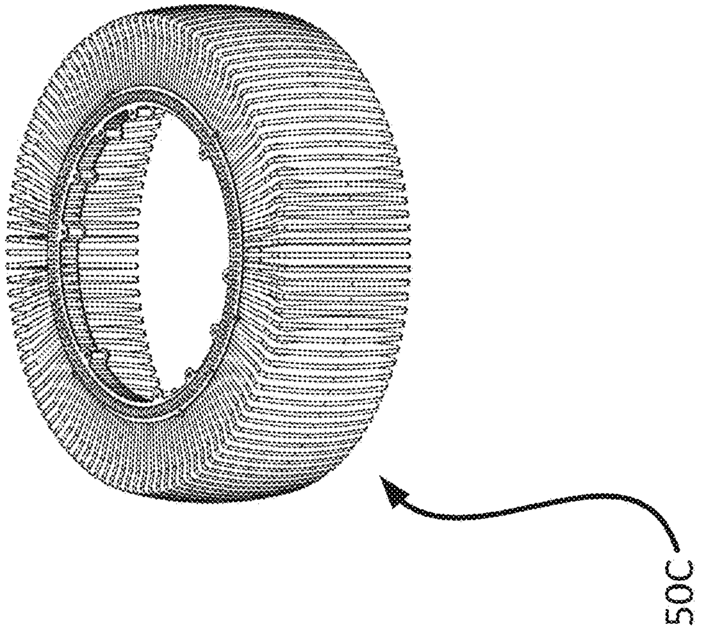
FIGS. 6A-C are front perspective views of example shade subassembly portions of the example lighting fixture illustrated in FIG. 1.
Figure 6B:
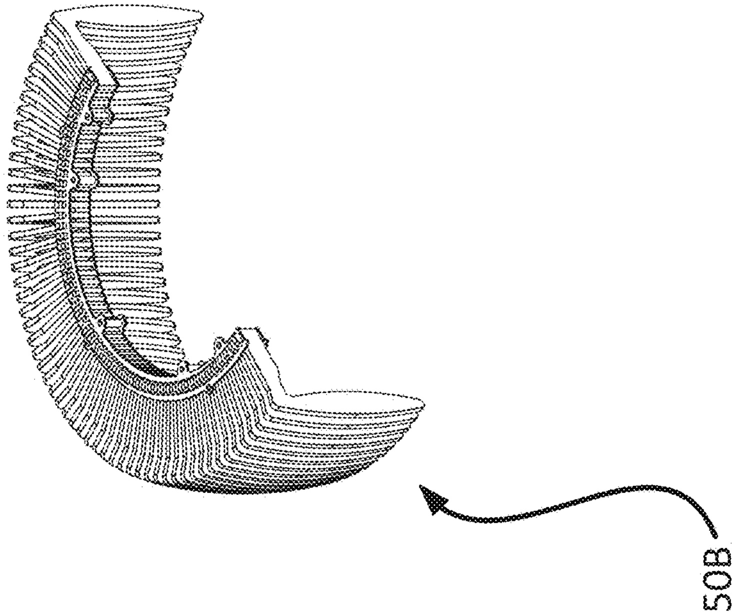
Figure 6A:
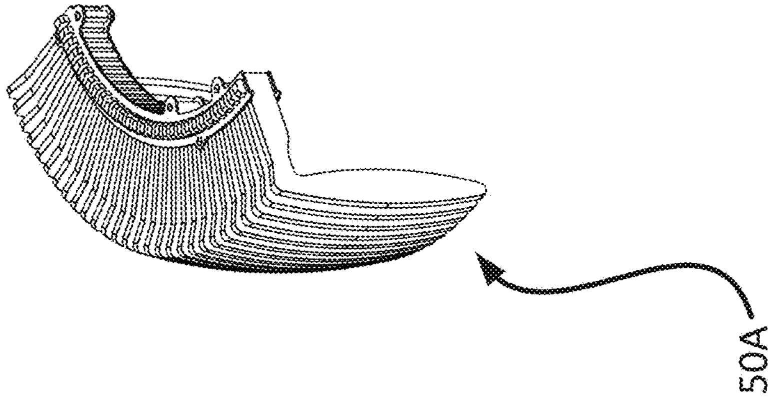

FIGS. 6A-C illustrate example configuration embodiments of shade subassemblies 50A-C. FIGS. 6A-B are a front perspective views of embodiments of shade subassembly 50A-C of light fixture 10, as illustrated in FIG. 1. In some embodiments, such as the embodiments illustrated in FIGS. 6A-B, shade subassembly 50A-B may be preliminarily assembled in segments, where multiple segments may be fastenably and modularly attached together to form a perimeter around a fixture. In the example illustrated in FIG. 6A, shade subassembly 50A is a one-third segment of a total perimeter of fixture 10. In the example illustrated in FIG. 6B, shade subassembly 50B is a one-half segment of a total perimeter of fixture 10. FIG. 6C is a front perspective view of an example embodiment of shade subassembly 50C of light fixture 10 illustrated in FIG. 1. In some embodiments, such as the embodiment illustrated in FIG. 6C, shade subassembly 50C may be assembled as one complete shade which spans the entire perimeter of the fixture. In some embodiments, the shade subassembly may comprise a semi-circular module. In some embodiments, the shade subassembly may comprise a module shaped as one-third, or some other fraction of a circle.

Figure 7A:
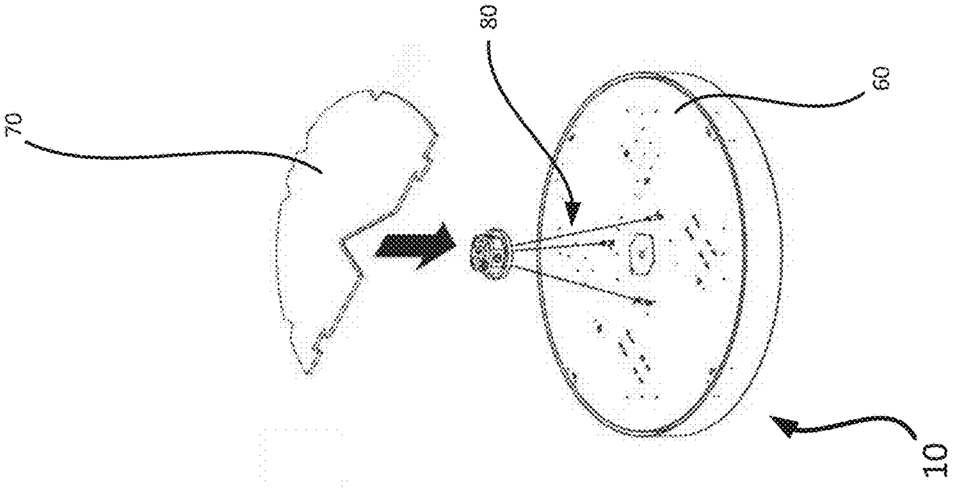
FIG. 7A is a top perspective view of the example lighting fixture illustrated in FIG. 1, showing an example placement of an installation guide onto the example lighting fixture.

FIGS. 7A-D illustrate an example installation of shade subassembly 50 onto base 60 of fixture 10. FIG. 7A is a top-front perspective view of lighting fixture 10 as shown in FIG. 1. As shown in FIG. 7A, installation guide 70 may be placed on top of base 60 of fixture 10. Installation guide 70 may be placed over suspension mechanism 80 so as to not interfere with the cables of suspension mechanism 80. Installation guide 70 may further include one piece that is substantially circular and which may be folded and unfolded, or, as shown in the example in FIG. 7A, may come in two or more pieces that may be fastened together with interlocking features on the two or more installation guide pieces.

Figure 7B:
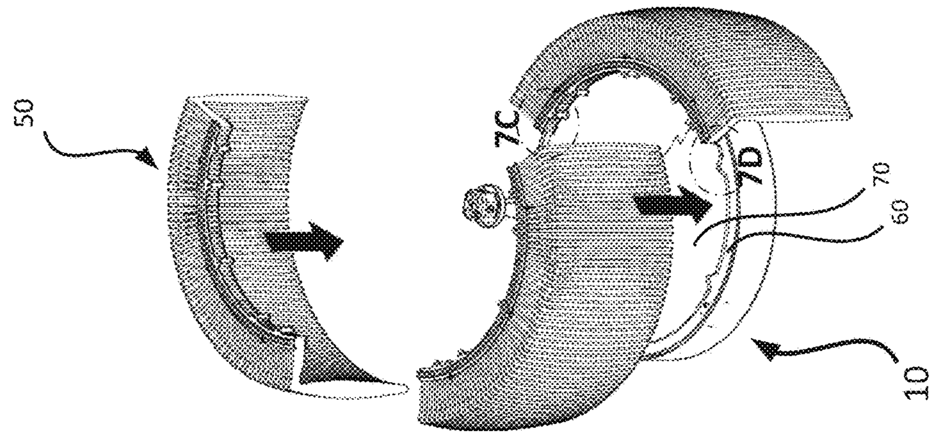
FIG. 7B is a top perspective view of the example lighting fixture illustrated in FIG. 1, showing an example fragmented installation of the shade subassemblies illustrated in FIG. 6.
Figure 7C:
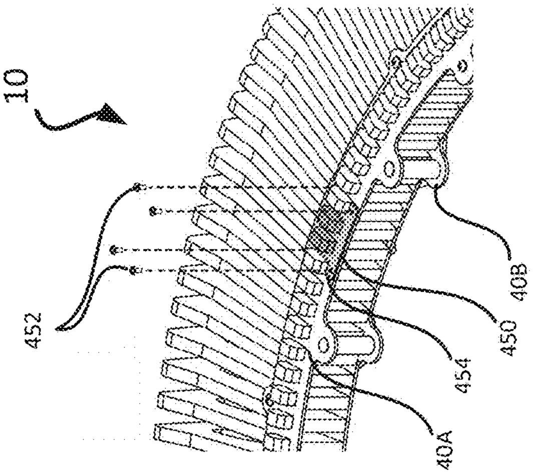
FIG. 7C is a detailed view showing detail 7C of an example joiner bracket for the shade subassembly illustrated in FIG. 6A, the joiner bracket used to connect shade subassemblies 6A through 6C, in the installation shown in FIG. 7B.

FIG. 7B is a front perspective view of lighting fixture 10 as shown in FIG. 1. FIG. 7C is a detail view of lighting fixture 10 as shown in FIG. 1, showing in detail the connection between two segments of shade subassembly 50. As shown in FIG. 7B, sections of shade subassembly 50 may be placed onto base 60 of fixture 10. Shown in FIG. 7B and in greater detail in FIG. 7C, shade subassembly 50 may be separated into two or more segments which may be placed around the perimeter of fixture 10. Segments of shade subassembly 50 may connect together via connecting geometry on support brackets 40. Additionally, support brackets 40 may be fastened together by one or more joiner brackets 450. Joiner bracket 450 may contain a plurality of fastener apertures 454. In an example, support joiner bracket 450 may be placed partially over support bracket 40 of one shade subassembly 50, and partially over support bracket 40 of another shade subassembly 50. Fasteners 452 may be driven through fastener apertures 454 of joiner bracket 450 and into both support brackets 40 of first and second shade subassemblies 50, securing shade subassemblies 50 to one another around base 60 of fixture 10. Joiner bracket 450 may be installed onto both top support bracket 40A and bottom support bracket 40B to add additional support and rigidity to support brackets 40A, 40B. Joiner brackets, such as joiner bracket 450, additionally allow baffle vanes 30 to be installed in subassemblies, which may reduce the overall effort needed to insert baffle vanes 30 into support bracket 40, by reducing the number of baffle vanes 30 to be inserted at any one time.

Figure 7D:
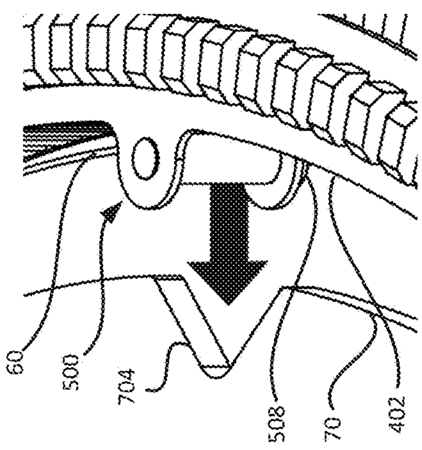
FIG. 7D is a detailed view showing detail 7D of an example installation of the shade subassembly illustrated in FIG. 6A according to the installation shown in FIG. 7B.

In FIG. 7D, lighting fixture 10 is shown with shade subassembly 50 fitting into installation guide 70. As shown in FIG. 7D, installation guide 70 may include at least one, but in some examples a plurality of notches 704. Clamping mechanism 500 of shade subassembly 50 located on inner perimeter 402 of support bracket 40 may fit into and be at least partially constrained by notch 704 on installation guide 70, such that notch 704 on installation guide prevents shade subassembly 50 from rotating about base 60 of fixture 10, and may prevent at least some translational movement of shade subassembly 50 about base 60 of fixture 10. Additionally, base 60 of fixture 10 may be manufactured from a metallic or magnetic alloy, such that magnetic element 508 (see FIG. 5B) of clamping mechanism 500 may be attracted to base 60 of fixture 10, and hold shade subassembly 50 substantially in place about base 60 of fixture 10.

The present invention provides a sound management solution regardless of whether light fixture components are integrated therewith, while eliminating the need for expensive construction, lamination, painting or other treatment of a lighting fixture, relying instead upon the modular acoustic panels for providing aesthetics-together with structural rigidity and integrity, again with or without a lighting feature. Acoustic panels can be easily replaced with panels of a different color, texture, size or density as changes in a room design require. The modular system of affixing baffle vanes to a lighting fixture allows for baffles of different size, shape, and different color and/or textures to be used together on the same fixture, which allows for custom configurations of varying sizes, shapes, colors and textures present in the same fixture. Likewise, the modular configuration in which baffle vanes are attached to the fixture allows the system to accommodate fixtures of varying sizes, shapes, diameters, etc. By varying the size, shape, diameter, or other physical parameters of the support bracket used to affix baffle vanes to the fixture, the present invention may further accommodate a wide range of fixtures, both containing lighting solutions, acoustic solutions, or a combination of each. Additionally, within the same fixture, baffle vanes may be configured for modularity and adaptability to allow for multiple sizes of varying diameter, varying height and varying baffle vane profiles. Each baffle vane may be offered in solid color, multiple colors, including variations using non-uniform, dual color, or alternating colors and textures. Baffle vane profile designs may change within the same fixture to provide the visual effect of continuous change in the profile of the fixture, with or without desired contours.

Although certain example embodiments of an apparatus have been described herein, the scope of coverage of this patent is not limited thereto. On the contrary, this patent covers all methods, apparatuses, and articles of manufacture fairly falling within the scope of the appended claims, either literally or under the doctrine of equivalents, as are presented in any non-provisional patent application filed hereon.

We claim:

1. A fixture comprising:

a first bracket having a first plurality of vane attachment apertures;

a second bracket having a second plurality of vane attachment apertures, the second bracket positioned below said first bracket, said second bracket aligned with the first bracket such that the second plurality of vane attachment apertures operably aligns with the first plurality of vane attachment apertures;

a plurality of baffle vanes, each comprising:

a lateral portion having a first end and a second end;

a longitudinal portion extending from the second end of the lateral portion;

baffle vane attachment elements positioned at the first end of said baffle vanes to fastenably attach said baffle vanes to said first and second brackets; and a clamping mechanism configured to fix the position of the first bracket relative to the position of the second bracket, within the plurality of the baffle vanes;

wherein said baffle vane attachment elements further comprise: a first protrusion extending upwardly from the first end of the lateral portion, the first protrusion configured to be received by one of the first plurality of aligned apertures; and a second protrusion extending downwardly from the first end of the lateral portion, the second protrusion configured to be received by one of the second plurality of operably aligned apertures.

2. The fixture of claim 1, wherein a height of the first protrusion extending upwardly is greater than a depth of the second protrusion extending downwardly.

3. The fixture of claim 2, wherein the position of the first bracket relative to the position of the second bracket within the plurality of the baffle vanes is configured such that a baffle vane may be removably affixed between the first and second brackets.

4. The fixture of claim 1, wherein the shapes of the first bracket and the second bracket are identical.

5. The fixture of claim 1, wherein each of the plurality of baffles is substantially L-shaped.

6. The fixture of claim 1, further comprising:

a central base configured to connect to the second bracket; and a suspension mechanism coupled to the central base and configured to affix the fixture to an elevated structure.

7. The fixture of claim 6, wherein the clamping mechanism comprises a magnetic element configured to orient and restrain the position of the second bracket relative to the central base.

8. The fixture of claim 6, wherein the central base includes a lighting element.

9. The fixture of claim 6, wherein each of the plurality of baffle vanes extends radially relative to a center of the central base.

10. The fixture of claim 6, wherein the clamping mechanism restrainably attaches the second bracket to the central base.

11. The fixture of claim 10, wherein the clamping mechanism comprises:

a first tab extending radially from the first bracket;

a second tab extending radially from the second bracket; and a bushing member positioned between the first tab and the second tab for orientation within an aligned detent in the central base.

12. The fixture of claim 11, wherein the clamping mechanism is a first clamping mechanism and the first and second tabs are located on one of the inner perimeter and outer perimeter of the first and second brackets, the fixture further comprising:

a second clamping mechanism comprising:

a third tab extending radially from the first bracket;

a fourth tab extending radially from the second bracket;

a bushing member positioned between the third tab and the fourth tab;

wherein the third and fourth tabs are located on the other of the inner diameter and the outer diameter of the first and second brackets.

13. The fixture of claim 1, wherein the first bracket and the second bracket further comprise two or more bracket segments joined together to form the first bracket and second bracket.

14. The fixture of claim 13, further comprising one or more straight bracket segments insertable between the two or more curved bracket segments to form a substantially non-circular shaped fixture geometry.

15. A lighting fixture comprising:

a base comprising a lighting element;

a first band connected to the base, the first band including a first plurality of slots;

a second band identical to the first band, the second band including a second plurality of slots in alignment with the first plurality of slots of the first band; and a plurality of sound-dampening elements, each comprising a first protrusion and a second protrusion configured for restrainable attachment to said first and second plurality of slots respectively, the first protrusion and the second protrusion extending in opposite directions to each other, wherein the plurality of sound-dampening elements are held in place around the base via at least one of said first band and second bands.

16. The lighting fixture of claim 15, wherein the plurality of sound dampening elements are held in place around the base via said first bands and said second bands.

17. The lighting fixture of claim 15, wherein the first band is curvilinear.

18. The lighting fixture of claim 15, wherein the first band is in the shape of a quadrilateral.

19. The lighting fixture of claim 15, wherein the first band comprises modular sub-components capable of integrated assembly into different shapes, as desired.

20. The lighting fixture of claim 15, wherein the lighting fixture comprises a suspension mechanism configured to attach to the first band, and further configured to affix the lighting fixture to an elevated structure.

21. The lighting fixture of claim 15, further comprising a suspension mechanism attached directly to either of the first or second bands.

22. The lighting fixture of claim 15, wherein:

the first band and the second band are concentric.

23. The lighting fixture of claim 15, wherein each of the plurality of sound-dampening elements extends radially relative to a center of the base.

24. A method for assembling a fixture, the method comprising:

providing a first bracket, the first bracket having a first plurality of slots;

inserting, into each of the first plurality of slots, a first portion of one of a plurality of sound-dampening elements;

positioning a second bracket atop the plurality of sound-dampening elements by inserting a second portion of one of the plurality of sound-dampening elements into each of a second plurality of slots in the second bracket, a first protrusion extending from the first portion and a second protrusion extending from the second portion, the first and second protrusions extending through the first and second plurality of slots in opposite directions to each other; providing a center hub and inserting at least one fastener into the center hub through the first bracket and the second bracket, thereby affixing the first bracket and the second bracket to the center hub.

25. The method of claim 24, further comprising:

attaching a first end of a suspension mechanism to the center hub and a second end of the suspension mechanism to an elevated structure.

26. The method of claim 24, further comprising:

attaching a first end of a suspension mechanism to the second bracket and a second end of the suspension mechanism to an elevated structure.

27. The method of claim 24, wherein the center hub includes a lighting element.

28. The method of claim 24, wherein the first bracket and the second bracket are of identical shapes.

29. The method of claim 24, wherein the first bracket and the second bracket are of different shapes.

30. The method of claim 24, wherein the at least one fastener causes the first bracket and the second bracket to clamp about the plurality of sound-dampening elements.

* * * * *